(12) United States Patent
Harpreet

(10) Patent No.: US 10,445,197 B1
(45) Date of Patent: Oct. 15, 2019

(54) DETECTING FAILOVER EVENTS AT SECONDARY NODES

(71) Applicant: Amazon Technologies, Inc., Seattle, WA (US)

(72) Inventor: Harpreet, Singapore (SG)

(73) Assignee: Amazon Technologies, Inc., Seattle, WA (US)

(*) Notice: Subject to any disclaimer, the term of this patent is extended or adjusted under 35 U.S.C. 154(b) by 141 days.

(21) Appl. No.: 15/605,833

(22) Filed: May 25, 2017

(51) Int. Cl.
*G06F 11/00* (2006.01)
*G06F 11/20* (2006.01)
*H04L 12/26* (2006.01)
*G06F 11/34* (2006.01)
*G06F 11/30* (2006.01)

(52) U.S. Cl.
CPC ...... *G06F 11/2023* (2013.01); *G06F 11/3006* (2013.01); *G06F 11/3409* (2013.01); *H04L 43/0811* (2013.01); *G06F 2201/85* (2013.01)

(58) Field of Classification Search
CPC ............ G06F 11/2023; G06F 11/3006; G06F 11/3409; G06F 11/2028; G06F 11/203; G06F 2201/85; H04L 43/0811
See application file for complete search history.

(56) References Cited

U.S. PATENT DOCUMENTS

| | | | |
|---|---|---|---|
| 6,944,788 B2 | 9/2005 | Dinker et al. | |
| 7,380,163 B2 | 5/2008 | Davies et al. | |
| 7,634,679 B2 | 12/2009 | Quintiliano | |
| 8,327,003 B2 | 12/2012 | Newport | |
| 2007/0180314 A1* | 8/2007 | Kawashima | G06F 11/2023 714/15 |
| 2007/0234115 A1* | 10/2007 | Saika | G06F 11/2028 714/13 |
| 2015/0363124 A1* | 12/2015 | Rath | G06F 11/2097 709/219 |
| 2018/0095849 A1* | 4/2018 | Jolad | G06F 11/2007 |
| 2018/0267870 A1* | 9/2018 | Bhatia | G06F 11/2028 |

* cited by examiner

*Primary Examiner* — Joseph D Manoskey
(74) *Attorney, Agent, or Firm* — Robert C. Kowert; Meyertons, Hood, Kivlin, Kowert & Goetzel, P.C.

(57) ABSTRACT

Secondary nodes may detect failover operations for applications performing at a primary node. Application state indications may be collected at a primary node and reported to a monitor for the primary node. A secondary node may obtain the state indications from the monitor in order to evaluate whether the application is performing correctly at the primary and if not, trigger a failover operation to switch performance of the application to the secondary node. In some embodiments, the state information may be encoded into a single metric that can be obtained by the secondary node and evaluated to detect failover events.

20 Claims, 8 Drawing Sheets

| Virtual IP Reachable | Communication with Secondary | Application Running | State Encoding |
|---|---|---|---|
| YES | YES | YES | 7 |
| YES | YES | NO | 3 |
| YES | NO | YES | 5 |
| YES | NO | NO | 1 |
| NO | YES | YES | 6 |
| NO | YES | NO | 2 |
| NO | NO | YES | 4 |
| NO | NO | NO | 0 |

States 3, 5, 1, 6, 2, 4, 0 may trigger failover operation 410

FIG. 4

DETECTING FAILOVER EVENTS AT SECONDARY NODES

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

Virtual machines may be provided as part of a provider network that offers use of virtual machines to multiple different clients. The virtual machines may be hosted in different locations, of which each location may continue operating independent of faults or failures that may occur in other locations. Clients may wish to locate virtual machines in diverse locations to provide greater fault tolerance for applications implemented by the virtual machines. In order to ensure high availability between applications performing upon the virtual machines, techniques to switch performance from virtual computing resource to another may be desirable.

BRIEF DESCRIPTION OF THE DRAWINGS

FIG. 4 is an example chart of application states and encoding scheme, according to some embodiments.

Figure 1:
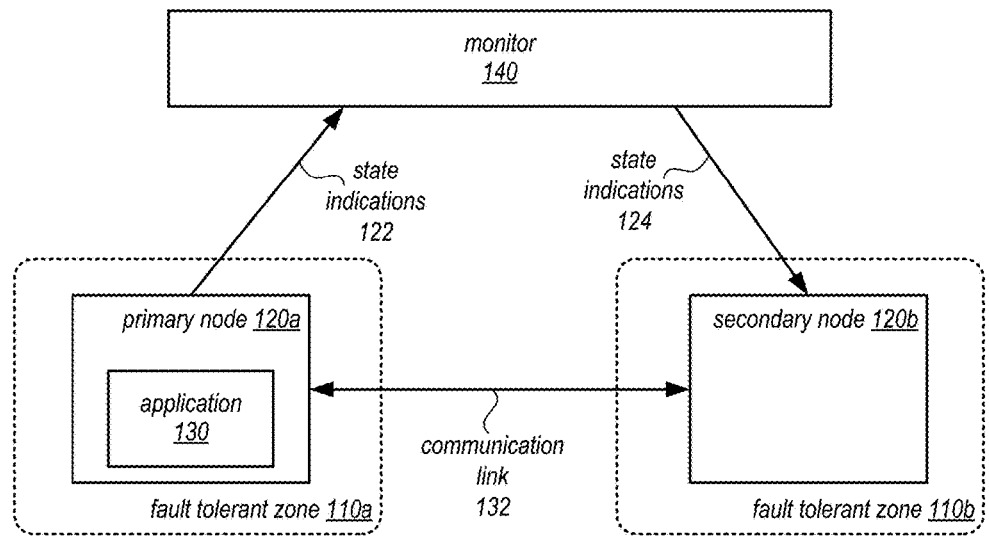
FIG. 1 is a series of block diagrams illustrating detecting failover events at a secondary node, according to some embodiments.
Figure 1:
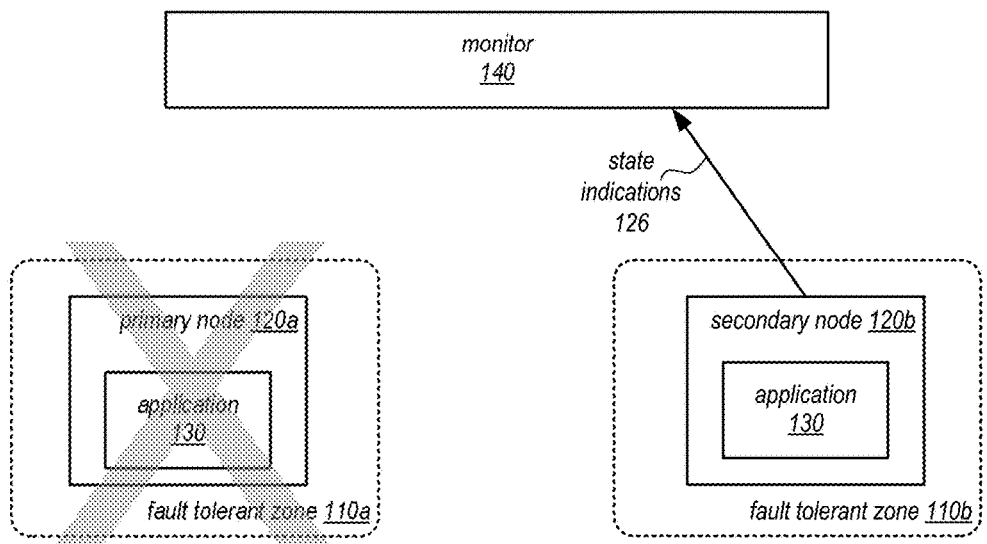

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may detect failover events at secondary nodes, according to some embodiments. Different kinds of applications can benefit from implementing high availability techniques, in some embodiments. For example, web-based services or other network-based services may be relied upon to facilitate transactions, direct the operation of remote devices, or manage (e.g., access or update) data in a wide variety of scenarios, in some embodiments. For those services or other applications that may rely upon a single entry point or single control mechanism for performing transactions, directing operations, or managing data, a single point of failure may be unavoidable, in some embodiments. In the event that a failure of an application occurs, a failover operation may be performed to switch performance of the application from one node (e.g., a device, system, or host) to another node, in some embodiments. In this way, the application may continue to operate with little interruption (e.g., to the facilitation of transactions, operational direction, or data management), in some embodiments.

Consider the example of a database application that may be hosted on a server (e.g., a primary server) that is a single point of access for updating a database, in one embodiment. The database application may process requests to insert data into the database, update tables in the database, delete data from the database, or perform various other operations, including the processing of queries to retrieve data from the database, in one embodiment. In order to provide high availability for the database, another server (e.g., a secondary server), capable of running the database application may be online and available to take over in the event that the database application is unable to continue to operate (e.g., due to primary server error, application error, or connectivity error for receiving requests), in one embodiment. A failover operation would cause the secondary server to begin processing requests for the database instead of the primary server (e.g., by rerouting requests to the secondary server and/or shutting down the database application at the primary server), in one embodiment.

In various embodiments, a secondary node can detect a failover event for a primary node based on an evaluation of application state information obtained from a monitor of a primary node. In this way, a secondary node can detect a failover event and proceed to switch performance of an application without obtaining a quorum or other right to failover from a third node (e.g. a system, service or device) that arbitrates when a failover operation can be performed. For example, in the event of a failure in communication between a primary node and secondary node, a secondary node can evaluation state indications from the monitor to determine whether or not a failover should occur—preventing the secondary node from initiating failover when there is only a communication failure between nodes and not a failure of the application (e.g., a split-brain scenario). More-over, as state indications can be generated from the primary node and provided to the secondary node via a monitor for the primary node, a separate failover management system or device (e.g., a coordinator, arbitrator, quorum manager, etc.) is not necessary to make the determination about whether a failover is necessary, reducing the cost and management responsibility for implementing failover operations to provide high availability.

FIG. 1 is a series of block diagrams illustrating detecting failover events at a secondary node, according to some embodiments. As illustrated in scene 102, primary node 120 may a server, computing device, or system, such as computer system 1000 discussed below with regard to FIG. 8, in some embodiments. Primary node 120 may implement, execute, or otherwise perform an application, such as application 130, in some embodiments. For example, application 130 may be a database application, as discussed in the example above, or implement other systems or services (e.g., that facilitate transactions, direct the operation of remote devices, or manage/provide access to data), in one embodiment. Application 130 may be single point of access or control for data, in some embodiments (e.g., a database volume stored in a data store attached to primary node 120a or a separate storage node or device may only be accessed via application 130).

Secondary node 120b may be implemented, in various embodiments, as a standby node that may execute, run, or otherwise perform application 130 in the event that application 130 is unable to correctly perform at primary node 120a. For example, primary node 120a may be un-reachable to clients or other external network connections, in some embodiments, or primary node 120a may be experiencing hardware or software failures that prevent application 130 from correctly performing.

Secondary node 120b may detect a failover event for application 130 based on state indications 124 received from monitor 140. Monitor 140 may be a separate system, service or other component that monitors the performance of primary node and/or application 130. For example, primary node 120a may be implemented as part of a network-based service in a provider network, as discussed below with regard to FIGS. 2-5, and monitor 140 may be separate service or component within the network-based service as part of providing primary node (and other resources) to users of the network-based service. Monitor 140 may request and/or receive from primary node 120a a variety of performance metric, in some embodiments. For example, primary node 120a may indicate the utilization of processors, storage components or devices, network bandwidth or capacity for sending or receiving information, or any other measure of the operation of primary node 120a. As part of the metrics obtained by monitor 140, state indications 122 may be reported, in some embodiments. For example, state indications may indicate whether primary node 120a is healthy enough to perform application 130, whether application 130 is running, whether primary node 120a can communicate with other computing systems or devices, such as client devices or via communication link 132 with secondary node 120b. In at least some embodiments, as discussed below with regard to FIG. 4, the state indications 122 may be encoded into a single metric value (which may be interpreted at secondary node 120b.

Secondary node 120b may monitor, poll for, request, and/or otherwise receive state indications 124 from monitor 140. For example, secondary node 120b may periodically request state indications 124 to determine whether a new state indication or change to the state indications, may trigger a failover event. In some embodiments, a detection of the failure of a communication link 132 (e.g., a network communication link) between primary node 120a and secondary node 120b may trigger a request for state indications 124 from monitor 140. In this way, secondary node 120b can determine whether a failover operation should be triggered (e.g., as discussed below with regard to FIGS. 6 and 7), based on the state indications 124. In this way, a network partition or other failure preventing communication between primary node 120a and secondary node 120b may not necessarily trigger a failover operation with confirming based on state indications 124 that application 130 is no longer able to correctly perform (e.g., preventing a split brain where both nodes 120a and 120b are performing application 130.

In at least some embodiments, nodes may be located so as to prevent common failures between the nodes (e.g., due to the failure of a same hardware component). For example, different fault tolerant zones 110a and 110b may be implemented or utilized so that a failure in one fault tolerant zone does not affect the performance of a node in another fault tolerant zone, in some embodiments. A fault tolerant zone may operate independently of a failure of another fault tolerant zone, in some embodiments. Fault tolerant zones may be geographically diverse, in some embodiments. For instance, one or more data centers that may implement a particular fault tolerant zone may be located in a different geographic location (e.g., different data center room, data center, plant or facility location, city, county, state, country, or continent). Independent power sources, networking infrastructure, or various other configurations of resources in a fault tolerant zone may allow for availability zones to be independently accessible to client or management requests. For example, different server racks that have independent power sources and/or networking devices (e.g., different switches) may be different fault tolerant zones, while in other embodiments fault tolerant zones may encompass individual data centers or collections of data centers in a given geographic region (e.g., in a city). Monitor 140 may be distributed or replicated so as to be accessible to different nodes in different fault tolerant zones. In at least some embodiments, monitor 140 may be implemented in a separate fault tolerant zone or network than either primary node 120a or secondary node 120b.

As illustrated in scene 104, due to state indications 124, secondary node 120b has detected and performed a failover operation to switch performance of application 130 to secondary node 120b from primary node 120a, in some embodiments. The operations performed as part of the failover operation may be dependent on state of primary node 120a. For example, in one embodiment if the primary node 120a is unable to accept external requests from clients (event though application 130 is running and primary node 120a can communicate with monitor 140 and secondary node 120b, then secondary node 120b may trigger a failover operation that reroutes requests for application 130 to secondary node 120b, starts performing application 130 at secondary node 120b, and sends an instruction to kill, stop, or otherwise halt performance of application 130. For example, a control plane, management system, or other component (not illustrated) may implemented an interface via which secondary node 120b can send a request to halt performance of the application at the primary node. The control plane, management system, or other component may then send a command to the primary node to reboot, restart, kill, stop, or halt execution of the application, in one embodiment. In another example, if the application halts, freezes, or stops performing (whether or not primary node 120a is available and/or can communicate with other systems, then secondary node 120b may perform a failover operation that reroutes traffic to secondary node 120b and starts performance of application 130 at secondary node 120b, in one embodiment. As illustrated in scene 104, in embodiments where communication link 132 between primary node 120a and secondary node 120b fails, then secondary node 120b can initiate a failover operation by ensuring that primary node 120a and application 130 are not performing correctly, in order to prevent a split-brain scenario.

In some embodiments, upon completion of the failover operation, secondary node 120b may begin to report state indications 126 for application 130 to provide metrics for a new secondary node to begin monitoring to trigger a failover operation in the event of a failure at secondary node 120b. In some embodiments, the secondary node 120b may identify as a new primary node for application 130. In at least some embodiments, primary node may recover or restart and assume a role of a secondary node for application 130, and begin monitoring the state indications 126 provided to monitor 140 (not illustrated).

Please note that previous descriptions are not intended to be limiting, but are merely provided as an example of applications, nodes, monitors, and fault tolerant zones.

The specification next includes a general description of a provider network including multiple availability zones, which may implement detecting failover events at secondary node implemented in a different availability zone than a primary node. Then various examples of a provider network are discussed, including different components/modules, or arrangements of components/module that may be employed as part of implementing a provider network. A number of different methods and techniques to implement detecting failover events at secondary node are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
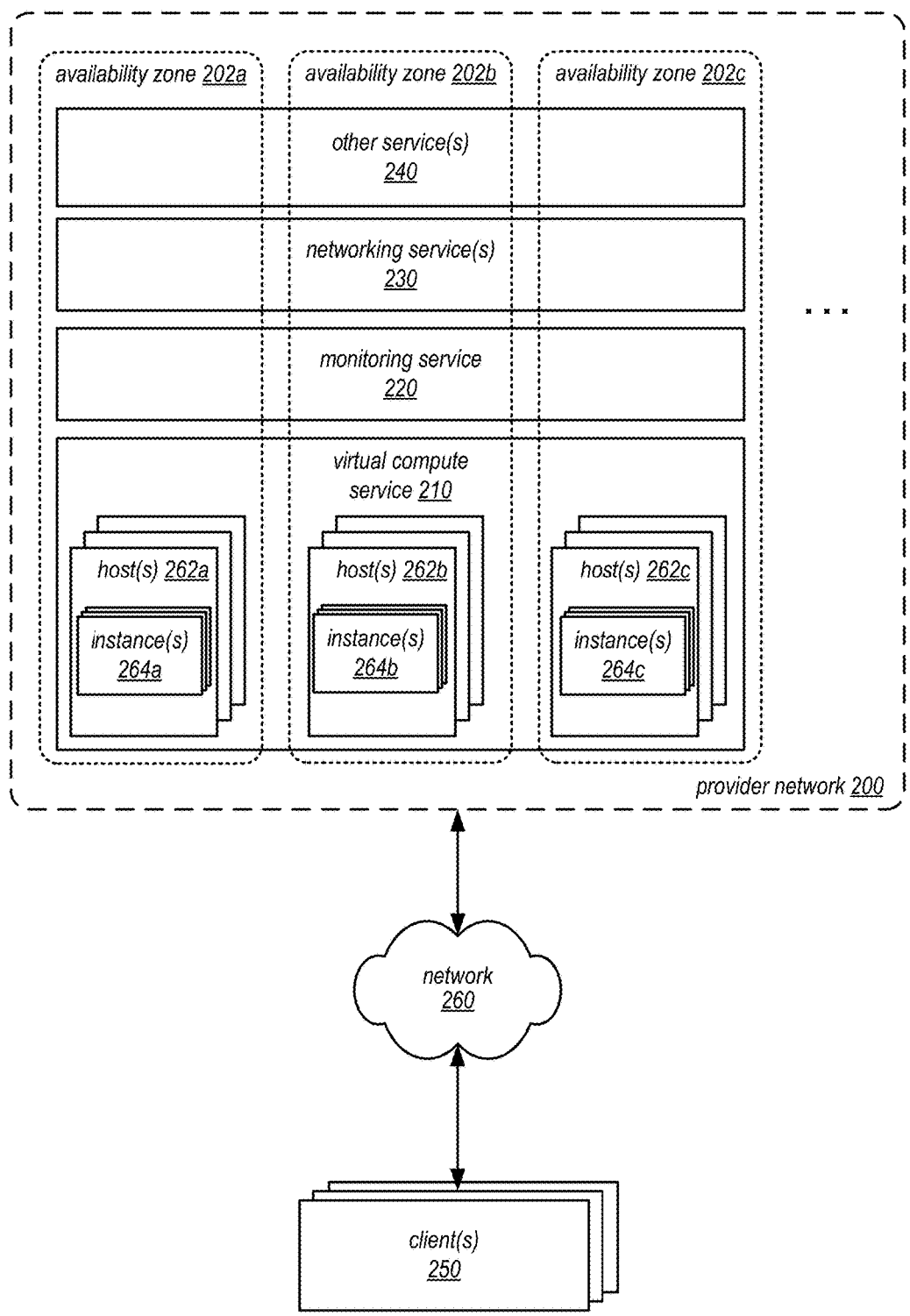
FIG. 2 is a block diagram illustrating a provider network that can implement computing resources to perform an application in different availability zones, according to some embodiments.

FIG. 2 is a block diagram illustrating a provider network that can implement computing resources to perform an application in different availability zones, according to some embodiments. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like, needed to implement and distribute the infrastructure and services offered by the provider network 200. In various embodiments, provider network 200 may include numerous availability zones, such as availability zones 202a, 202b, 202c, and so on, which may be implemented as fault tolerant zones for hosting and or providing services as part of provider network 200. Operation of a particular availably zone may continue irrespective of a failure of another availability zone. In some embodiments, provider network 200 may provide virtual computing resources as part of virtual computing service 210. These computing resources may in some embodiments be offered to clients in units called "instances," 264 such as virtual or physical compute instances or storage instances located in individual availably zones 202, which are implemented on different hosts(s) in respective availability zones 202, such as instances 264a, 264b, and 264c, implemented on host(s) 262a, 262b, 262c, and so on. Similarly, other computing service(s), which may include a monitoring service 220, networking service 230, and various other service(s) 240 (e.g., various other storage, processing, networking or any other computing resource may be provided as resources for client(s) 250).

A virtual compute instance 264 implemented at a host 262 and offered by virtual compute service 21 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 264 of provider network 200 in different embodiments, including general purpose or special purpose computer servers, storage devices, network devices and the like.

Compute instances 264 may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 250 applications (which may implement failover detection at secondary nodes (e.g., other hosts in other availability zones) via metrics reported for the application to monitoring service 220), without for example requiring the client 250 to access an instance 264. In some embodiments, compute instances 264 have different types or configurations based on expected uptime ratios. The uptime ratio of a particular compute instance 264 may be defined as the ratio of the amount of time the instance 264 is activated, to the total amount of time for which the instance 264 is reserved. Uptime ratios may also be referred to as utilizations in some implementations. If a client expects to use a compute instance 264 for a relatively small fraction of the time for which the instance 264 is reserved (e.g., 30%-35% of a year-long reservation), the client may decide to reserve the instance 264 as a Low Uptime Ratio instance, and pay a discounted hourly usage fee in accordance with the associated pricing policy. If the client expects to have a steady-state workload that requires an instance to be up most of the time, the client may reserve a High Uptime Ratio instance 264 and potentially pay an even lower hourly usage fee, although in some embodiments the hourly fee may be charged for the entire duration of the reservation, regardless of the actual number of hours of use, in accordance with pricing policy. An option for Medium Uptime Ratio instances 264, with a corresponding pricing policy, may be supported in some embodiments as well, where the upfront costs and the per-hour costs fall between the corresponding High Uptime Ratio and Low Uptime Ratio costs.

Compute instance 264 configurations may also include compute instances 264 with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. As discussed above, with regard to FIG. 1, in at least some embodiments, the applications implemented at a compute instance 264 may be a single point of control or access for the application so that only one node may actively perform the application at a time.

In various embodiments, compute instances 264 may be associated with one or more different security groups. Security groups may enforce one or more network traffic policies for network traffic at members of the security group. Membership in a security group may not be related to physical location or implementation of a compute instance 264. A security group may enforce respective network traffic policies for their member instances 264. The previous descriptions are not intended to be limiting, but merely illustrative of the many different configurations possible for a compute instances 264 implemented as part of virtual compute service 210 provided by provider network 200.

Different availability zones 202 may be host different instantiations of services, such as different hosts(s) 262 that implement different instances 264 offered by virtual compute service 210. For example availability zone 202a includes hosts 262a, availability zone 202b includes hosts 262b, and availability zone 202c includes hosts 262c. Multiple hosts 262 (e.g., compute nodes, systems or servers, such as computing system 1000 described below with regard to FIG. 8) may be respectively located in individual availability zones 202 may implement and/or manage multiple compute instances 264, in some embodiments. A host 262 may include a virtualization management module capable of instantiating and managing a number of different client-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by clients on whose behalf the compute instances 264 run, but may instead be responsible for various administrative or control-plane operations of the network provider, including responding to requests to provision, configure, start and/or stop compute instances 264.

In various embodiments, other computing services may provide other resources in similar ways. For instance, different storage resources may be located in availability zones 202a, 202b and 202c respectively, in some embodiments. Storage resources may include one or more storage nodes, for example, that may store a data volume resource that acts as a virtual block storage device for a particular instance 264 of virtual compute service 210. In such a scenario, the data volume may be collocated in the same availability zone 202 as the host implementing the particular instance.

Although not illustrated, in various embodiments provider network 200 may also implement a control plane. The control plane may provide and/or perform various administrative functions and tasks for virtual computing service 210, monitoring service 220, networking service(s) 230, and other computing service(s) 270. For example, the control plane may implement various client management features.

For example, the control plane may coordinate the metering and accounting of client usage of network-based services, including computing resources, such as by tracking the identities of requesting clients 250, the number and/or frequency of client requests, the types and times instances are utilized, size of data stored or retrieved on behalf of clients 250, overall storage bandwidth used by clients 250 or any other measurable client usage parameter. The control plane may also implement financial accounting and billing systems, or may maintain a database of usage data that may be queried and processed by external systems for reporting and billing of client usage activity. In some embodiments, the control plane may collect, monitor and/or aggregate a variety of provider network operational metrics, such as metrics reflecting the rates and types of requests received from clients 250, bandwidth utilized by such requests, system processing latency for such requests, system component utilization (e.g., network bandwidth and/or utilization within the provider network and within specific availability zones), rates and types of errors, or any other suitable metrics. In some embodiments such metrics may be used by system administrators to tune and maintain system components, while in other embodiments such metrics (or relevant portions of such metrics) may be exposed to clients 250 to enable such clients to monitor their usage of virtual computing service 210, and/or other computing service(s) (or the underlying systems that implement those services) via monitoring service 220.

In some embodiments, the control plane may also implement user authentication and access control procedures. For example, for a given network-based services request to access a particular instance, the control plane may ascertain whether the client 250 associated with the request is authorized to access the particular instance. The control plane may determine such authorization by, for example, evaluating an identity, password or other credential against credentials associated with the particular database, or evaluating the requested access to the particular instance against an access control list for the particular instance.

In some embodiments, provider network may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components 250 as well as external networks 260 (e.g., the Internet). In some embodiments, provider network 200 may implement networking service(s) 230 to employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory (e.g., provided by mapping service in networking service 230) to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are. Implementing the overlay network may allow network addresses to be moved or attached to different resources, such as compute instances 264, when performing a failover operation, as discussed below with regard to FIG. 3.

Clients 250 may encompass any type of client configurable to submit requests to network provider 200. For example, a given client 250 may include a suitable version of a web browser, or may include a plug-in module or other type of code module that can execute as an extension to or within an execution environment provided by a web browser. Alternatively, a client 250 may encompass an application such as a computing resource tool or application (or user interface thereof), a media application, an office application or any other application that may make use of compute instances 264 or other resources in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 250 may generate network-based services requests according to a Representational State Transfer (REST)-style network-based services architecture, a document-based or message-based network-based services architecture, or another suitable network-based services architecture. In some embodiments, a client 250 (e.g., a computational client) may provide access to a compute instance in a manner that is transparent to applications implement on the client 250 utilizing computational resources provided by the compute instance 264.

Clients 250 may convey network-based services requests to provider network 200 via network 260. In various embodiments, network 260 may encompass any suitable combination of networking hardware and protocols necessary to establish network-based communications between clients 250 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
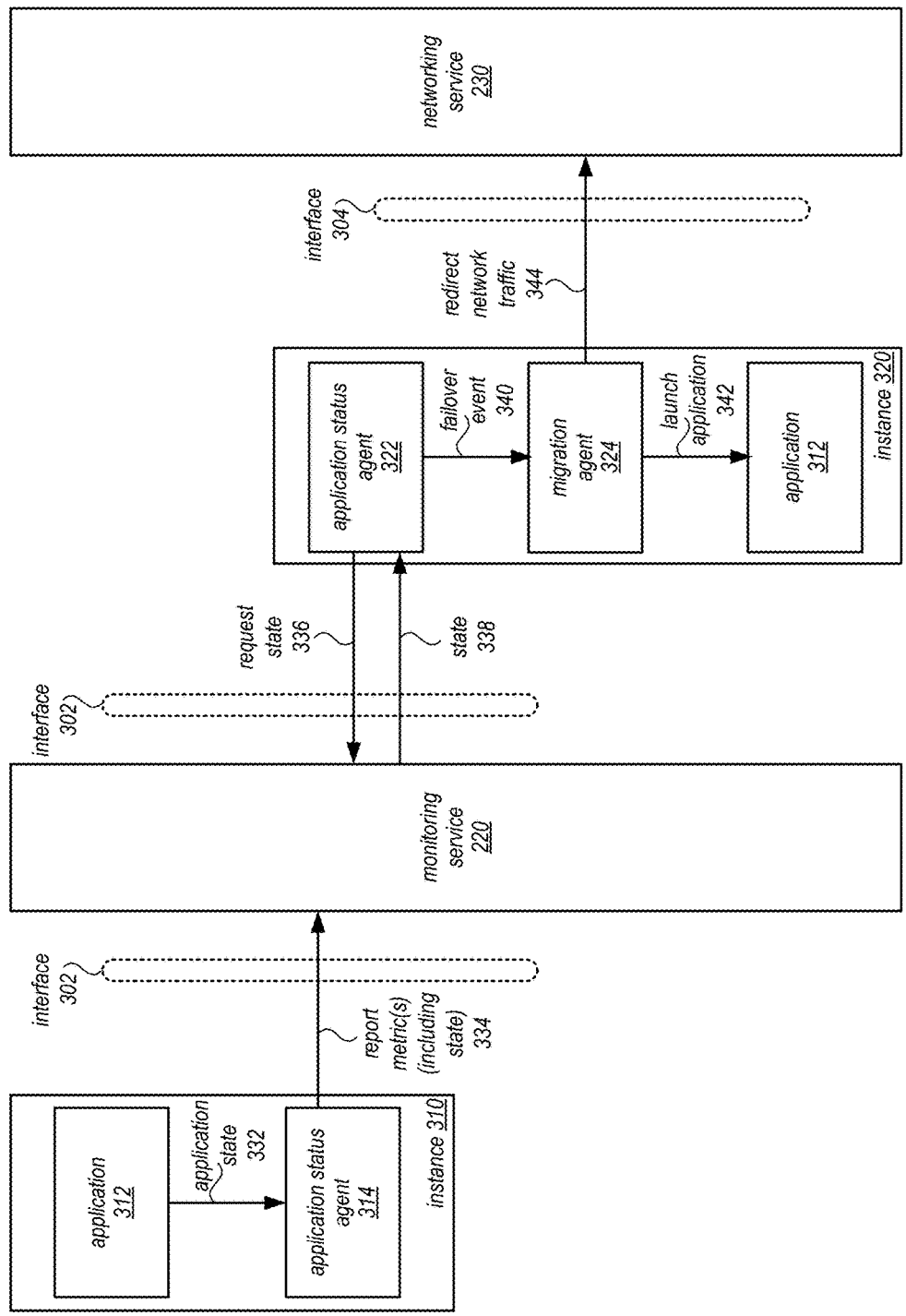
FIG. 3 is a block diagram illustrating interactions between application status agents at different hosts and a monitoring service to detect failover events for an application performing at one of the hosts, according to some embodiments.

In at least some embodiments, failover detection may be implemented separately from the applications for which failover is desired. In this way, applications can be updated or changed without having to change the operation of reporting application state or detecting failover operations based on the reported application state. FIG. 3 is a block diagram illustrating interactions between application status agents at different hosts and a monitoring service to detect failover events for an application performing at one of the hosts, according to some embodiments.

Instance 310 may run, execute, or otherwise perform application 312. Separately from application 312, instance 310 may implement application status agent 314, which may collect or determine application state 332 for reporting to monitoring service 334. In some embodiments, application status agent 314 may be implemented or provided by a client when launching, provisioning, or configuring the instance (e.g., as part of an image file for instance 310 that includes both application 312 and application status agent 314). In some embodiments, application status agent 314 may be provisioned, configured, installed, or launched with instance 310 and may be managed or provided by monitoring service 220. For example, a client could utilize an interface, such as interface 302 offered by monitoring service 220, to configure the application state and other information to include as metrics reported by application status agent 314 and how the state information may be interpreted by an application status agent, such as application status agent 322, at a secondary node or other standby system that may assume performance of application 312 in the event of a failover. For example, a truth table, encoding formula, decision tree for detecting and triggering failover operations based on application state may be defined at monitoring service 220 (e.g., by defining metrics and encoding values as discussed below with regard to FIG. 4).

Application status agent 314 may perform the various tests, requests, or other diagnostics to collect the desired metrics indicating application state, in some embodiments. For example, applications status agent 314 may perform heartbeat messaging with the secondary node implemented as instance 320, by sending pings or other heartbeat indications to application status agent 322 (as well as processing pings or other heartbeat indications received from application status agent 322), in some embodiments. Application status agent 314 may monitor the number of requests made to application 312 by clients, the performance of application 312 (e.g., request processing latency), or the liveness of communications with other systems (e.g., request routers, the mapping service of networking service(s) 230, or other component that directs requests to instance 310 for application 312). If encoding techniques are implemented, application status agent 314 may encode the state indications in to a single metric value or other subset of metrics values, and report the metric(s) 334 to monitoring service 22 via interface 302.

Monitoring service 220 may be implemented by provider network 220 to collect and provide access to standard and customized metrics for resources operating within provider network 200, in some embodiments. The resources may be logically grouped or associated with a user account of provider network so that the appropriate account credentials may be needed to access the metrics, in some embodiments. Metrics may be stored in log files and monitored for custom events or alarms created for resources or services, in some embodiments. Monitoring service 220 may implement a common interface 302 (e.g., a programmatic interface, such as an Application Programming Interface (API) and/or other interface, such as a graphical user interface hosted at a network-based site). Monitoring service 220 may, in some embodiments, replicate or make metrics available across availability zones, and may be tolerant of failures in any one availability zone so that metrics reported for resources in the failed availability zone may still be available to other systems or devices (e.g., a secondary node) implemented in a different availability zone.

In at least some embodiments, a secondary node that is on standby for application 312 may be implemented as part of instance 320. Instance 320 may implement application status agent 322, to monitor the state of application 312, in various embodiments, by requesting 336 and receiving the state 338 of the application (e.g., by periodically polling the monitoring service 220). Based on the received state 338, applications status agent 322 may determine whether a failover event has occurred, as discussed below with regard to FIGS. 6 and 7. For example, application status agent may compare failover event criteria to received state information, in some embodiments (e.g., comparing application latency with threshold values, determining whether instance 310 can communicate with instance 320, determining whether instance 310 can communicate with clients or routing devices (e.g., a virtual address), etc.). Based on the failover criteria, application status agent 322 may detect a failover event for application 312. Application status agent 322 may provide an indication of the failover event 340 to migration agent 324, in some embodiments.

In at least some embodiments, instance 320 may implement migration agent 324 to perform a failover operation, which may be separate from the monitoring for and detection of a failover event. In this way, implementation of failover events may be developed and implemented independently from the detection of failover events, in some embodiments. Migration agent 324 may, in some embodiments, identify the different operations to perform based on the detected failover event. For example, migration agent 324 may determine that if instance 310 is crashed, or otherwise unavailable, a failover operation to halt execution of application 312 may not need to be performed. Alternatively, in those instances where a failover operation is to be performed while application 312 might still execute (or is still executing) at instance 310, migration agent 324 may send a request to halt execution of application 312 to a control plane for virtual compute service 210 to halt, reboot, or restart instance 310 (which may then process and perform the request).

As illustrated in FIG. 3, migration agent may perform operation so to redirect network traffic for application 312 to instance 320 by sending a request 344 to redirect network traffic to networking service 230 via interface 304 for networking service (e.g., by sending the appropriate API request to move, switch or acquire the address formerly mapped to instance 310 to be changed to instance 320). Migration agent 324 may also perform operations to configure and/or launch 342 application 312 at instance 320. While migration agent 324 is illustrated as part of instance 320, in other embodiments, not illustrated, migration agent 324 may be implemented as part of a control plane service or separate migration system, component or device, which may perform similar techniques to those discussed above, or below with regard to FIGS. 6 and 7.

As discussed above, state indications for an application performing at a node may include a variety of information. The state indication may provide different granularities of the performance of an application (e.g., healthy performance, unhealthy performance, request processing latency, etc.), the application and/or node's ability to communicate with other systems or devices (e.g., secondary nodes, clients, routers or mapping services, monitors, etc.), whether the primary node is performing an update or maintenance so that the application is only temporarily offline, or any other information that may be evaluated to determine whether failover criteria have been satisfied. In some embodiments, an encoding may be applied to combine the information into a single metric, so that metric reporting and metric polling to monitor the metric at the secondary node may be limited to a single request and response (instead of multiple requests to obtain multiple different values). The encoded metrics may be decoded and evaluated or the encoded value may be mapped to different combinations of state indications so that the metric value may be evaluated to determine whether to perform a fail over operation. FIG. 4 is an example chart of application states and encoding scheme, according to some embodiments.

In FIG. 4, application state information whether a virtual Internet Protocol (IP) address is reachable by the primary node, which may indicate whether the primary node can accept client requests for the application, in some embodiments. In some embodiments, application state may indicate whether the primary node can communicate with the secondary node (e.g., which may indicate whether or not the secondary node is suffering from communication errors or failures if the secondary node cannot communicate with the primary node by the primary node indicates that it can communicate with the secondary node). In some embodiments, application state may indicate whether the application is running.

An example state encoding that includes all of the identified state information may be applied, in some embodiments. For example, unique values may be mapped to individual combinations of the state information. Consider an encoding technique that utilizes a series of numbers mapped to different state information (e.g., 1, 2, 4, 8, 16, 32 . . . ) such that sum of any of these numbers may not be within the series (e.g., 1+2 is not there, 1+2+4 is not there, and so on). By mapping each state indication to a different series value, the state encoding may be represented by a sum of the mapped values, in one embodiment. For instance, virtual IP reachable may be mapped to 1, communication with secondary may be mapped to 2, and application up and running may be mapped to 4. The reported value may then correspond to one of the combinations of state information, which may or may not trigger a failover operation. For example, some combinations 410 may trigger a failover operation (e.g., values 0, 1, 2, 3, 4, and 6) while other values (e.g., 5 and 7) may not. Thus, a received metric of 7 (1+2+4) may indicate that all application state information indicates that correct performance for the application is occurring, whereas a value of 3 (1+2), may indicate that while virtual IP is reachable, communication with secondary is possible, the application is down and failover should be triggered). Please note that the previous examples of application state and encodings are provided as an example and not intended to be limiting as to other application state or encodings that may be performed.

Figure 5A:
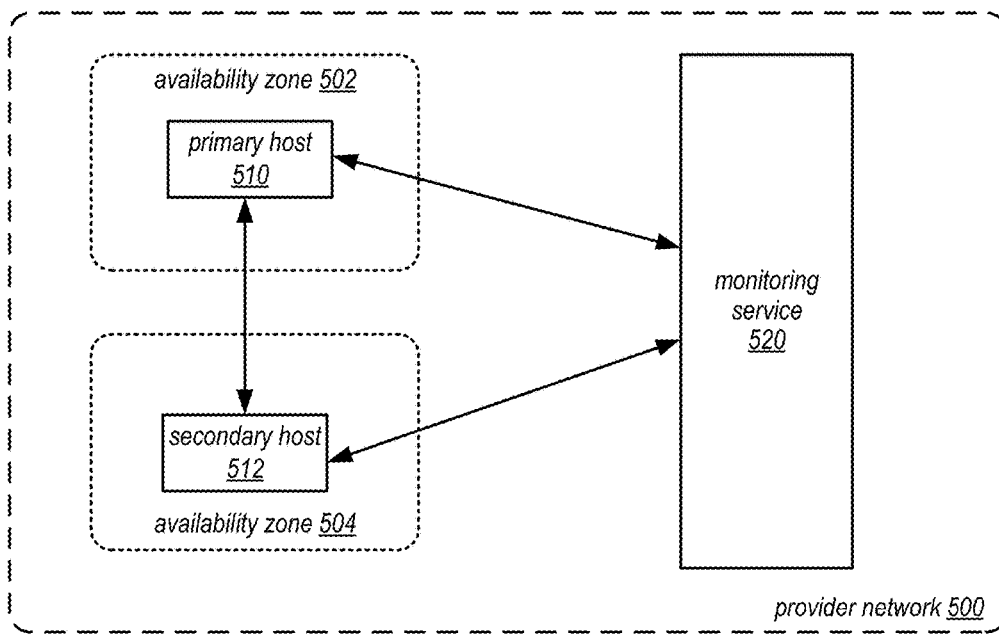
FIGS. 5A and 5B are logical block diagrams illustrating the detection of failover events across availability zone or network boundaries, according to some embodiments.
Figure 5B:
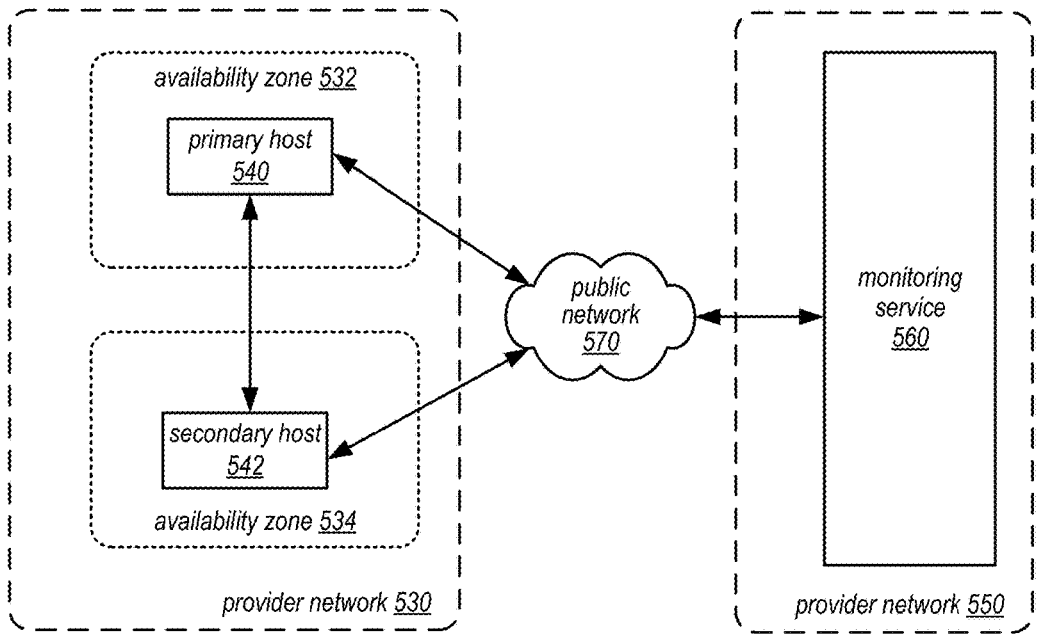

Different hosts for an application (or an instance implementing an application) differently located in order to configure or obtain different availability risks. For instance, as illustrated in FIG. 5A, within provider network 500 (e.g., similar to provider network 200 discussed above), each host, primary host 510 and secondary host 512 may be implemented in separate availability zones, 502 and 504 respectively. Monitoring service 520 may also be implemented as part of provider network 500 and may be accessible to each host in either availability zone. To further decouple risk, monitoring service 560 could be implemented in a separate provider network (550 or service outside of provider network 550), as illustrated in FIG. 5B, in some embodiments. For example, hosts 540 and 542 implemented in availability zones 532 and 534 respectively may report and monitor metrics from monitoring service 560 outside of provider network 530 via public network 570 (e.g., the Internet). In some embodiments, provider network 550 may be operated by the same entity as provider network 530, or in other embodiments may be operated by a different entity (e.g. a private network, such as an on-premise service). Although not illustrated, application state may be reported to multiple different monitoring services or components in different locations with different fault tolerances (e.g., in different networks, fault tolerant zones, etc.) so that a host may check with any of the possible recipients of application state to monitor a primary node.

Figure 6:
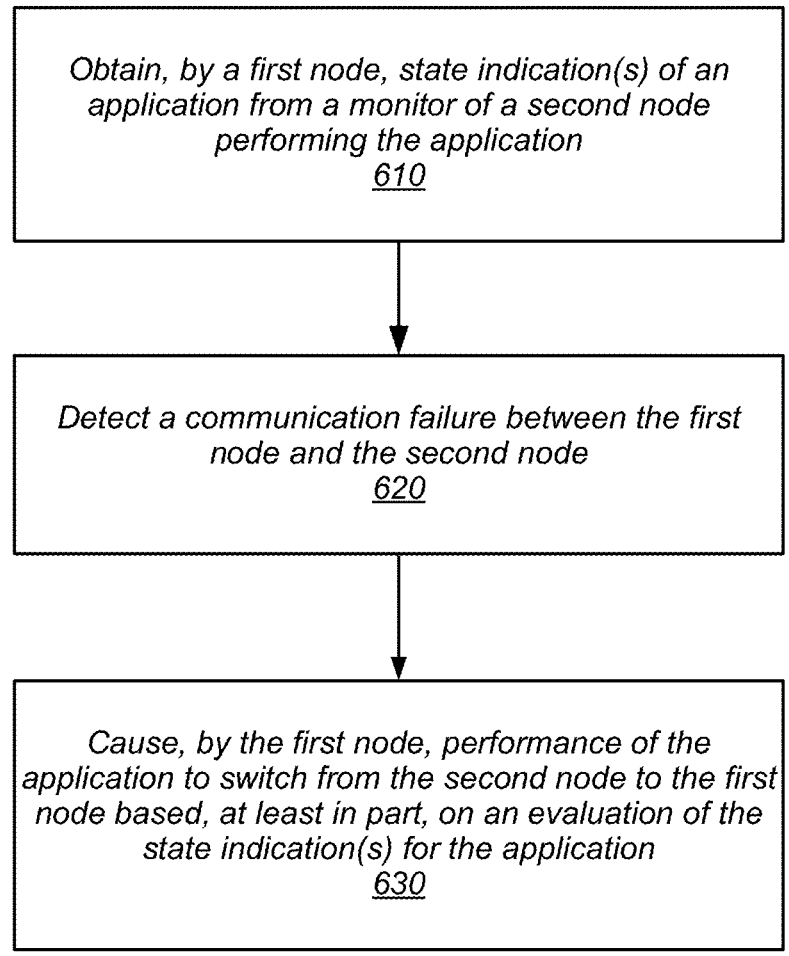
FIG. 6 is high-level flowchart illustrating various methods and techniques for detecting failover events at a secondary node, according to some embodiments.

The examples of detecting failover events at secondary nodes, as discussed above with regard to FIGS. 2-5B have been given in regard to virtual computing resources offered by a provider network. Various other types or configurations of systems that for which high availability is desirable may implement these techniques. FIG. 6 is high-level flowchart illustrating various methods and techniques for detecting failover events at a secondary node, according to some embodiments. These techniques, as well as the techniques of FIG. 7 described below may be implemented using various components of a provider network as described above with regard to FIGS. 2-5B or other types or systems.

As indicated at 610, a first node may obtain state indication(s) of an application from a monitor of a second node performing the application, in some embodiments. For example, the first node may register for and receive state indication(s) from the monitor as the updates are reported to the monitor by the second node, in some embodiments. Alternatively, in other embodiments, the first node may poll or request application state in response to events, such as the detection of a communication failure between the first node and the second node.

As indicated at 620, a communication failure may be detected between the first node and the second node, in at least some embodiments. For example, the second node may fail to respond to or send a heartbeat message or indication to the first node. In some embodiments, the communication failure may be detected as part of the application state reported by the second node (e.g., which may indicate that it cannot communicate with the first node—the secondary node).

As indicated at 630, the first node may cause performance of the application to switch from the first node to the second node based, at least in part, on an evaluation of the state indication(s) for the application. The first node may be a standby or other secondary node that is capable of performing the application. For example, the first node may be preconfigured to perform the application. In some embodiments, the application may already be running in the first node but may not perform any work until requests are redirected to the first node (e.g., reassigning a virtual IP address to change routing of requests for the application to the first node). In some embodiments, the application may be launched, instantiated, initialized, or otherwise obtained as part of causing performance of the application to switch from the first node to the second node. In at least some embodiments, an overlay network, routing layer or component, workload manager, or other component responsible for directing work to the application may be updated to direct new work for the application to be performed at the first node instead of the second node.

Figure 7:
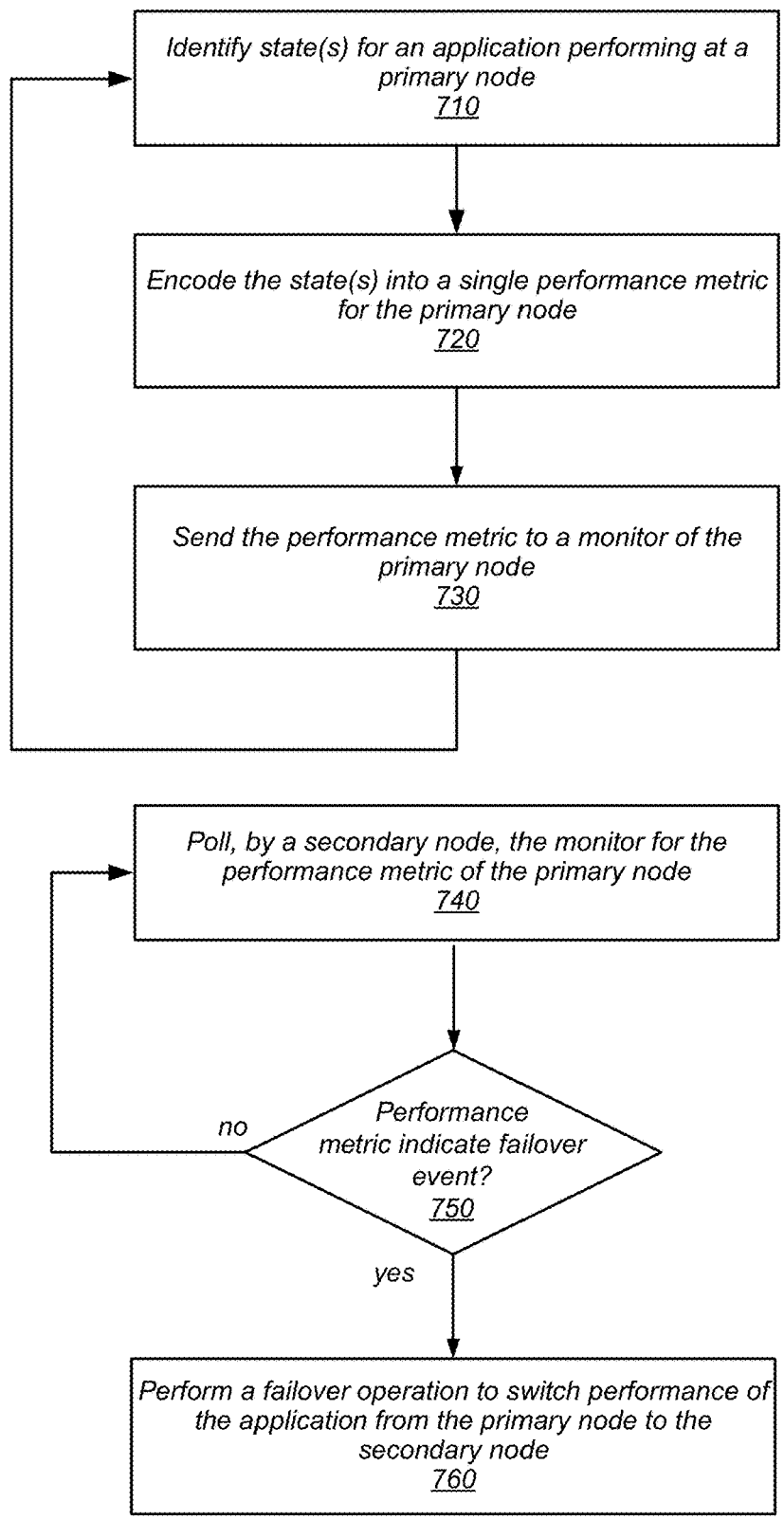
FIG. 7 is a high-level flowchart illustrating various methods and techniques for monitoring primary node metrics to detect a failover event at a secondary node, according to some embodiments.

FIG. 7 is a high-level flowchart illustrating various methods and techniques for monitoring primary node metrics to detect a failover event at a secondary node, according to some embodiments. As indicated at 710, state(s) for an application performing at a primary node may be identified, in various embodiments. For instance, the primary node (or an application status agent implemented thereon) may perform various tests, requests, or other diagnostics to collect the desired state information, such as heartbeat messaging with a secondary node, monitoring or calculating the number of requests made to the application by clients, the performance of application (e.g., request processing latency), or the liveness of communications with other systems (e.g., request routers, the mapping service of networking service(s) 230, or other component that directs requests or work to the application performing at the primary node.

As indicated at 720, the state(s) may be encoded into a single performance metric for the primary node, in some embodiments. For example, a number series mapping scheme as discussed above, with regard to FIG. 4 may be implemented, in one embodiment. In other embodiments, the state information may be concatenated into a single string with commas or another symbol delimiting the different state values. Binary encoding (e.g., indicating yes/no, true/false for each state indication) may be performed, in some embodiments.

As indicated at 730, the single performance metric may then be sent to a monitor of the primary node, in various embodiments. The performance metric may be formatted and sent via network-based interface to the monitor (e.g., utilizing an API to report the metric). In some embodiments, the API may be specific reporting the metric for application state and may be separate from other metric reporting APIs via which the monitor collects other metrics from the primary node. As indicated by the looping arrow, the reporting functionality performed for the primary node may be iteratively performed (e.g., according to reporting interval or in response to the detection of a reporting event, such as the detection of a communication failure or application failure).

As indicated at 740, a secondary node may poll the monitor for the performance metric, in various embodiments. In some embodiments, the performance metric may be decoded and compared with one or more sets of failover event criteria (e.g., with application performance threshold values, communication state values, etc.). In at least some embodiments, the performance metric may be mapped to failover events (or to application state(s) that indicate no failover operation is to be performed). If no failover event is indicated, as indicated by the negative exit from 750, then the polling of the performance metric at the monitor may continue. If a failover event is indicated, then a failover operation may be performed to switch performance of the application from the primary node to the secondary node. The failover operation may be determined based on the state(s) of the application indicated by the performance metric, in some embodiments. For example, a determination of whether or not a command to halt execution of the application at the primary node may be made based on whether the application is indicated to be running or not running by the performance metric. As noted above with regard to FIG. 6, an overlay network, routing layer or component, workload manager, or other component responsible for directing work to the application may be updated to direct new work for the application to be performed at the secondary node instead of the primary node. In at least some embodiments, the access permissions or keys to perform work at the secondary node may be obtained (e.g., by obtaining a lock on data to be operated on, a credential or token for performing work, etc.). In some embodiments, failover operations may not be indicated but other operations may be triggered based on the state(s) of an application. For example, a low performing application state may not trigger a failover but may trigger a deeper scan or analysis of the primary node to determine a corrective action to improve application performance, in one embodiment.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 8:
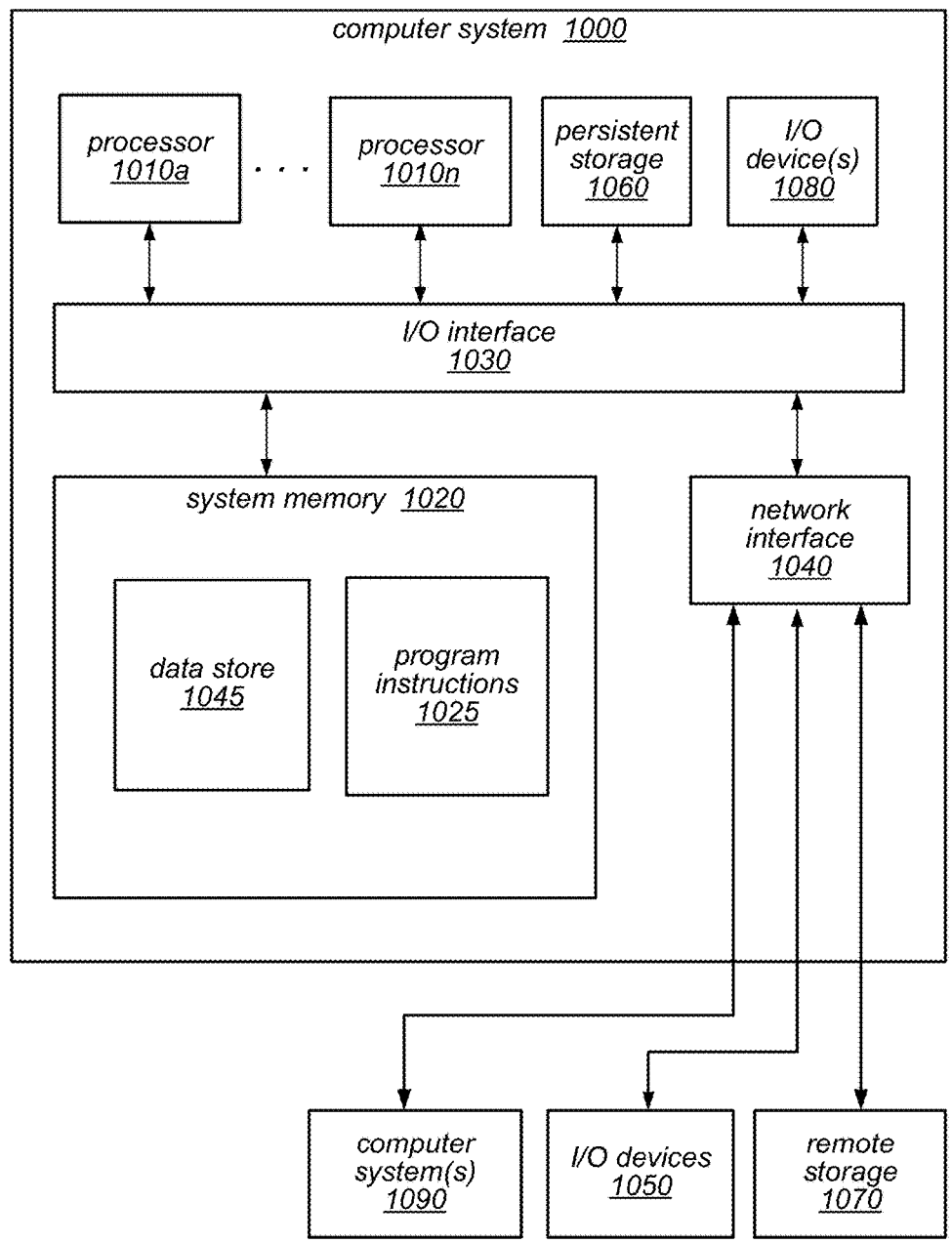
FIG. 8 is a block diagram illustrating an example computing system, according to some embodiments.

Detecting failover operations at a secondary node as described herein may be executed on one or more computer systems, which may interact with various other devices. FIG. 8 is a block diagram illustrating an example computer system, according to various embodiments. For example, computer system 1000 may implement computing nodes or compute nodes, whether stand alone or implemented as part of a compute cluster, a monitor, or any of the above described services. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing node, compute node, computing device, compute device, or electronic device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that can store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a memory to store program instructions which, if performed by at least one processor, cause the at least one processor to perform a method to at least:
   report, by a primary node, one or more state indications of an application performing at the primary node to a monitor for the primary node;
   poll, by a secondary node, the one or more state indications at the monitor;
   detect, by the secondary node, a communication failure between the primary node and the secondary node;
   in response to the detection of the communication failure:
     evaluate, by the secondary node, the state indications to identify a failover operation for the primary node; and
     perform, by the secondary node, the failover operation to switch performance of the application from the primary node to the secondary node.

2. The system of claim 1, wherein to report the state indications, the method includes encode the state indications into a single performance metric, wherein the single performance metric is reported to the monitor.

3. The system of claim 1, wherein to perform the failover operation to switch performance of the application from the primary node to the secondary node, the method includes send a request to halt performance of the application at the primary node.

4. The system of claim 1, wherein the primary node and the secondary node are implemented as part of a virtual compute service offered by a provider network, wherein the monitor is implemented as part of a monitoring service for the provider network, and wherein the failover operation includes sending a request to a networking service implemented as part of the provider network to redirect requests for the application to the secondary node.

5. A method, comprising:
obtaining, by a first node, one or more state indications of an application from a monitor of a second node performing the application;
detecting, by the first node, a communication failure between the first node and the second node; and
in response to detecting the communication failure, causing, by the first node, performance of the application to switch from the second node to the first node based, at least in part, on an evaluation of the state indications for the application.

6. The method of claim 5, further comprising:
identifying, by the second node, state indications for the application; and
sending, by the second node, the state indications to the monitor.

7. The method of claim 6, further comprising encoding, by the second node, the state indications into a single performance metric, wherein the single performance metric is sent to the monitor.

8. The method of claim 7, further comprising comparing, by the first node, the performance metric with a mapping for the state indications that identifies a failover operation for the application.

9. The method of claim 5, wherein causing, by the first node, performance of the application to switch from the second node to the first node comprises redirecting work for the application from the second node to the first node.

10. The method of claim 5, wherein causing, by the first node, performance of the application to switch from the second node to the first node comprises determining one or more failover operations to perform based, at least in part on the state indications.

11. The method of claim 5, wherein causing, by the first node, performance of the application to switch from the second node to the first node comprises sending a request to perform a failover operation to a migration agent.

12. The method of claim 5, further comprising:
upon switching performance of the application to the first node:
identifying, by the first node, one or more state indications for the performance of the application at the first node; and
sending, by the first node, the state indications for the performance of the application at the first node to the monitor.

13. The method of claim 5, wherein the application is a database application that provides access to a database on behalf of database clients, wherein the first node is a secondary node that is preconfigured to access the database, and wherein the second node is a primary node for the database.

14. A non-transitory, computer-readable storage medium, storing program instructions that when executed by one or more computing devices cause the one or more computing devices to implement:
receiving, at a secondary node, one or more state indications of an application collected by a monitor of a primary node performing the application;
detecting, by the secondary node, a communication failure between the primary node and the secondary node;
in response to detecting the communication failure:
evaluating, by the secondary node, the state indications to identify a failover operation for the primary node; and
performing, by the secondary node, the failover operation to switch performance of the application from the primary node to the secondary node.

15. The non-transitory, computer-readable storage medium of claim 14, wherein the program instructions cause the one or more computing devices to further implement:
identifying, by the primary node, the state indications for the application;
encoding, by the primary node, the state indications into a single performance metric; and
sending, by the primary node, the single performance metric to the monitor, wherein the single performance metric is received at the secondary node.

16. The non-transitory, computer-readable storage medium of claim 15, wherein, in evaluating, by the secondary node, the state indications to identify the failover operation for the primary node, the program instructions cause the one or more computing devices to implement:
decoding the single performance metric into the state indications; and
comparing the state indications to failover event criteria to identify the failover operation.

17. The non-transitory, computer-readable storage medium of claim 14, wherein, in receiving the state indications of the application collected by the monitor, the program instructions cause the one or more computing devices to implement sending via a public network a request to the monitor to obtain the state indications for the application, wherein the request is formatted according to an application programming interface (API) for the monitor.

18. The non-transitory, computer-readable storage medium of claim 14, wherein the failover operation redirects requests for the application from the primary node to the secondary node.

19. The non-transitory, computer-readable storage medium of claim 14, wherein the failover operation sends a request to halt performance of the application at the primary node.

20. The non-transitory, computer-readable storage medium of claim 14, wherein the primary node and the secondary node are implemented as part of a virtual compute service offered by a provider network, wherein the monitor is implemented as part of a monitoring service for the provider network, and wherein the failover operation includes sending a request to a networking service implemented as part of the provider network to redirect requests for the application to the secondary node.

* * * * *